US012706560B2

(12) United States Patent
Halperin et al.

(10) Patent No.: US 12,706,560 B2
(45) **Date of Patent: *Aug. 11, 2026**

(54) SYSTEM FOR TRACKING SOLAR ENERGY

(71) Applicant: AST & Science, LLC, Miami, FL (US)

(72) Inventors: Adam H. Halperin, Silver Spring, MD (US); Raymond J. Sedwick, University Park, MD (US)

(73) Assignee: AST & Science, LLC, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,880

(22) Filed: Mar. 7, 2023

(65) Prior Publication Data

US 2023/0303268 A1 Sep. 28, 2023

Related U.S. Application Data

(63) Continuation of application No. 17/175,486, filed on Feb. 12, 2021, now Pat. No. 11,623,768.

(60) Provisional application No. 62/976,127, filed on Feb. 13, 2020.

(51) Int. Cl.

*B64G 1/10* (2006.01)
*B64G 1/28* (2006.01)
*B64G 1/44* (2006.01)
*H02S 10/40* (2014.01)

(Continued)

(52) U.S. Cl.

CPC ............ *H02S 10/40* (2014.12); *B64G 1/1007* (2013.01); *B64G 1/286* (2013.01); *B64G 1/443* (2013.01); *B64U 50/31* (2023.01); *H02S 20/32* (2014.12)

(58) Field of Classification Search

CPC combination set(s) only.
See application file for complete search history.

(56) References Cited

U.S. PATENT DOCUMENTS 5,949,766 A * 9/1999 Ibanez-Meier .... H04B 7/18508 455/13.1
6,020,956 A * 2/2000 Herman ................ B64G 1/283 701/13

(Continued)

FOREIGN PATENT DOCUMENTS

JP H01266097 A 10/1989
JP 2006038209 A 2/2006
JP 2019001446 A 1/2019

OTHER PUBLICATIONS

Marshall et al. (doc. "Power-Optimal Guidance for Planar Space Solar Power Satellites" (Year: 2019).*

(Continued)

*Primary Examiner* — Assres H Woldemaryam
(74) *Attorney, Agent, or Firm* — Shumaker & Sieffert, P.A.

(57) ABSTRACT

An antenna system is configured for use in Low Earth Orbit (LEO) around Earth. The system has a plurality of antenna satellites coupled together to form a phased array. Each of the plurality of antenna satellites have an antenna body with an antenna and a solar cell. A processing device determines an orientation of the plurality of antenna satellites and position the phased array in the orientation based on an analysis of the solar cell of the antenna bodies facing the sun, the antenna of the antenna bodies facing the Earth, and maintaining a torque equilibrium of the phased array.

17 Claims, 9 Drawing Sheets

*Gyroscopically stabilized orientation*

(51) Int. Cl.
*B64U 50/31* (2023.01)
*H02S 20/32* (2014.01)

(56) References Cited

U.S. PATENT DOCUMENTS

| | | | | |
|---|---|---|---|---|
| 6,263,264 | B1 * | 7/2001 | Herman | B64G 1/34 701/13 |
| 8,123,173 | B1 | 2/2012 | Goodzeit et al. | |
| 9,973,266 | B1 | 5/2018 | Avellan et al. | |
| 2004/0122568 | A1 * | 6/2004 | Montfort | B64G 1/244 701/4 |
| 2007/0029446 | A1 * | 2/2007 | Mosher | B64G 1/10 244/158.1 |
| 2008/0099626 | A1 | 5/2008 | Bialke | |
| 2008/0315039 | A1 | 12/2008 | Rudd et al. | |
| 2010/0188304 | A1 * | 7/2010 | Clymer | H01Q 19/062 343/756 |
| 2012/0223189 | A1 * | 9/2012 | Kuninaka | B64G 1/10 244/158.4 |
| 2016/0065006 | A1 | 3/2016 | Woods | |
| 2016/0380580 | A1 * | 12/2016 | Atwater | H02S 40/30 244/158.4 |
| 2017/0047889 | A1 * | 2/2017 | Atwater | B64G 1/503 |
| 2017/0269610 | A1 | 9/2017 | Weiss et al. | |
| 2018/0315877 | A1 * | 11/2018 | Kelzenberg | B64G 1/443 |
| 2019/0238216 | A1 * | 8/2019 | Avellan | H04B 7/024 |
| 2020/0189770 | A1 | 6/2020 | Lemke | |
| 2021/0249767 | A1 * | 8/2021 | Greenwood | H01Q 21/061 |

OTHER PUBLICATIONS

NASA (doc. 19.1 Attitude Determination and Control Systems).*
Starin et al. NASA (doc. 19.1 Attitude Determination and Control Systems), 2010.*
Attitude Determination and Control Systems NTRS—NASA Technical Reports Server.*
International Preliminary Report on Patentability from International Application No. PCT/US2021/070148 dated Aug. 11, 2022, 6 pp.
Prosecution History from U.S. Appl. No. 17/175,486, now issued U.S. Pat. No. 11,623,768, dated Feb. 12, 2021, through Mar. 9, 2023, 126 pp.
U.S. Appl. No. 17/175,262, filed Feb. 12, 2021, naming inventors Halperin et al.
U.S. Appl. No. 18/362, 165, filed Jul. 31, 2023, naming inventors Zanon et al.
International Search Report and Written Opinion of International Application No. PCT/US2021/070148 dated Nov. 9, 2021, 8 pp.
Extended Search Report from counterpart European Application No. 21804984.9 dated Dec. 18, 2023, 8 pp.
First Office Action and Search Report, and translation thereof, from counterpart Indian Application No. 202217042773 dated Dec. 12, 2023, 6 pp.
Office Action from counterpart Canadian Application No. 3168876 dated Mar. 1, 2024, 5 pp.
Office Action, and translation thereof, from counterpart Japanese Application No. 2022-547207 dated Apr. 1, 2024, 12 pp.
Response to Extended Search Report dated Dec. 18, 2023, from counterpart European Application No. 21804984.9 filed Jun. 17, 2024, 55 pp.
Response to First Office Action dated Dec. 12, 2023, from counterpart Indian Application No. 202217042773 filed Jun. 7, 2024, 140 pp.
Response to Office Action dated Apr. 1, 2024, from counterpart Japanese Application No. 2022-547207 filed Jul. 31, 2024, 13 pp.
Response to Office Action dated Mar. 1, 2024, from counterpart Canadian Application No. 3,168,876 filed Jun. 27, 2024, 14 pp.
Notice of Intent to Grant from counterpart Japanese Application No. 2022-547207 dated Sep. 24, 2024, 5 pp.
Communication pursuant to Article 94(3) EPC from counterpart European Application No. 21804984.9 dated Mar. 14, 2025, 6 pp.
Hearing Notice from counterpart Indian Application No. 202217042773 dated Mar. 19, 2025, 3 pp.
First Office Action and Search Report, and translation thereof, from counterpart Korean Application No. 10-2022-7027619 dated May 26, 2025, 18 pp.
Office Action from counterpart Canadian Application No. 3,168,876 dated Sep. 10, 2025, 7 pp.
Response to Communication pursuant to Article 94(3) EPC dated Mar. 14, 2025, from counterpart European Application No. 21804984.9 filed Aug. 5, 2025, 13 pp.
Response to Office Action, and translation thereof, dated May 26, 2025, from counterpart Korean Application No. 10-2022-7027619 filed Aug. 25, 2025, 34 pp.
First Examination Report from counterpart Australian Application No. 2021273284 dated Feb. 20, 2026, 4 pp.
Office Action, and translation thereof, from counterpart Korean Application No. 10-2022-7027619 dated Feb. 25, 2026, 6 pp.
Response to Office Action dated Sep. 10, 2025, from counterpart Canadian Application No. 3,168,876 filed Jan. 9, 2026, 10 pp.
Communication pursuant to Article 94(3) EPC from counterpart European Application No. 21804984.9 dated Apr. 20, 2026, 6 pp.

* cited by examiner

*first stable orientation*

*second stable orientation*

*unstable equilibrium orientation* gyroscopically stabilized orientation

Orientation without gyroscopic stability

*Gyroscopically stabilized orientation*

*Unstable equilibrium orientation*

*Gyroscopically stabilized orientation*

*First Stable Orientation*

*Second Stable Orientation*

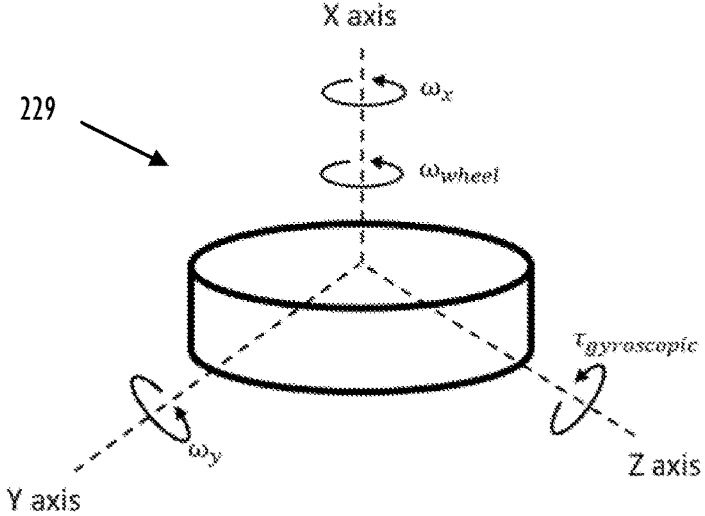
FIG. 7(b)
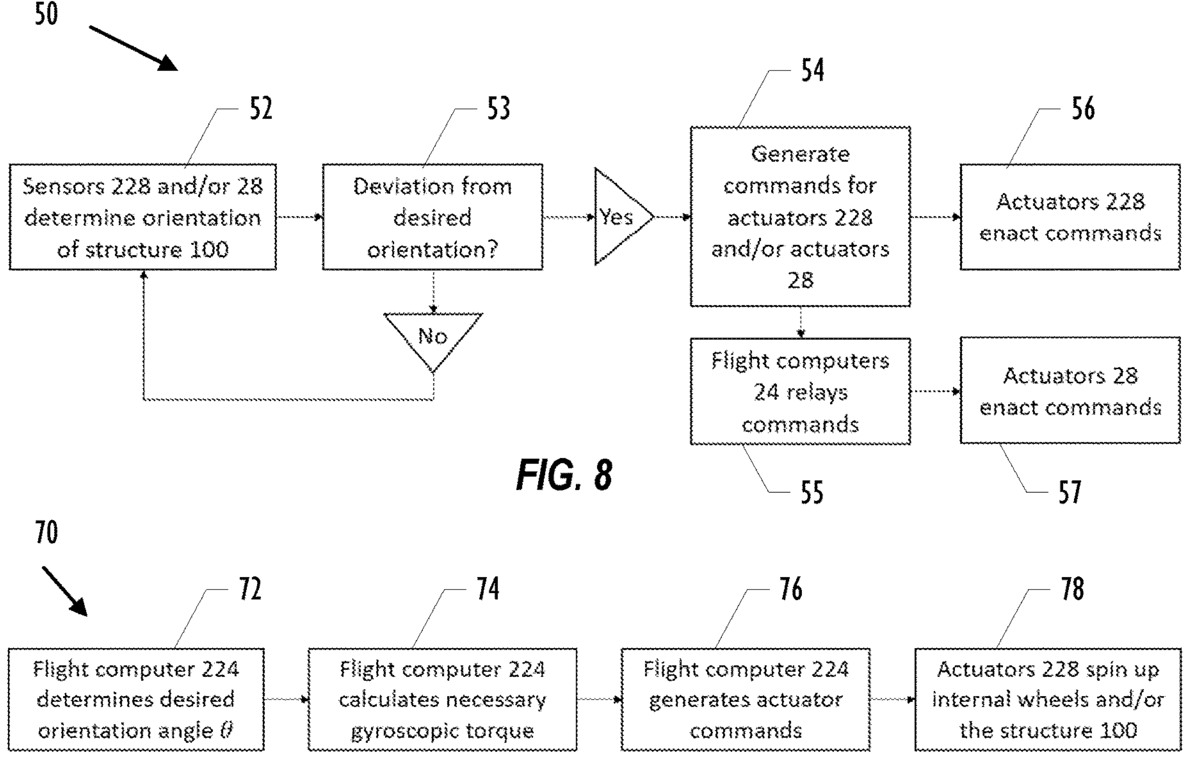
FIG. 8
FIG. 9

SYSTEM FOR TRACKING SOLAR ENERGY

RELATED APPLICATIONS

This application is a continuation of U.S. application Ser. No. 17/175,486 filed Feb. 12, 2021, which claims the benefit of priority of U.S. Provisional Application No. 62/976,127, filed on Feb. 13, 2020, the entire content of each of which are relied upon and incorporated herein by reference in their entirety.

BACKGROUND

U.S. Pat. No. 9,973,266 and U.S. Publ. No. 2019/0238216 show a system for assembling a large number of small satellite antenna assemblies in space to form a large array. The entire content of the '266 patent is incorporated herein by reference. As disclosed in the '266 Patent, FIGS. 1(*a*), 1(*b*) show a satellite communication system 100 having an array 300 of small satellites 10 and a central or control satellite 200. The small satellites 10 communicate with end users 500 within a footprint 400 on Earth, and also communicate with the control satellite 200, which in turn communicates with a gateway 600 at a base station. The small satellites 10 can each include, for example, a processing device (e.g., a processor or controller) and one or more antenna elements. And the control satellite 200 can include a processing device and one or more antenna or antenna elements. Thus, the large flat phase array 300 is made up of a plurality of satellite modules 10.

U.S. Patent Pub. No. 2016/0065006 to Woods shows a solar energy conversion and transmission system and method. Woods has solar cells at an orientation where they can receive sunlight, but fails to teach how that is achieved or even what kind of orientation that is.

SUMMARY

Accordingly, it is one object of the present disclosure to provide a structure for use in space that is large and flat with solar cells on one side and antennas on an opposite side. It is a further object of the present disclosure to provide such a structure with a control system and method that orients the solar cell side toward the sun and the antenna side toward Earth. It is a further object of the present disclosure for the control system to gyroscopically stabilize the gravity gradient torque. It is yet another object of the present disclosure for the structure and control system to operate in LEO where the gravity gradient is large and not easily overcome through other means like propulsion systems. It is yet another object of the present disclosure for the structure to counteract the gravity gradient torque using gyroscopic torques in the case where doing so improves sunlight received by the solar cells and does not excessively hinder phase array communications with users on the ground.

BRIEF DESCRIPTION OF THE FIGURES

FIG. 3(*b*) shows the second stable orientation;

FIG. 3(*c*) shows the unstable equilibrium orientation;

FIG. 3(*d*) shows the gyroscopically stabilized orientation;

FIG. 3(*e*) shows orientation without gyroscopic stability;

FIG. 3(*f*) shows the torques and rotations in the gyroscopically stabilized orientation;

FIG. 4(*b*) shows solar motion and radio-frequency communications cones and the gyroscopically stabilized orientation;

FIG. 4(*c*) shows solar motion and radio-frequency communications cones and the first stable orientation;

FIG. 4(*d*) shows solar motion and radio-frequency communications cones and the second stable orientation;

FIG. 7(*b*) is a block diagram of a gyroscopic component; and

FIGS. 8, 9 are flow diagrams.

DETAILED DESCRIPTION

Figure 1A:
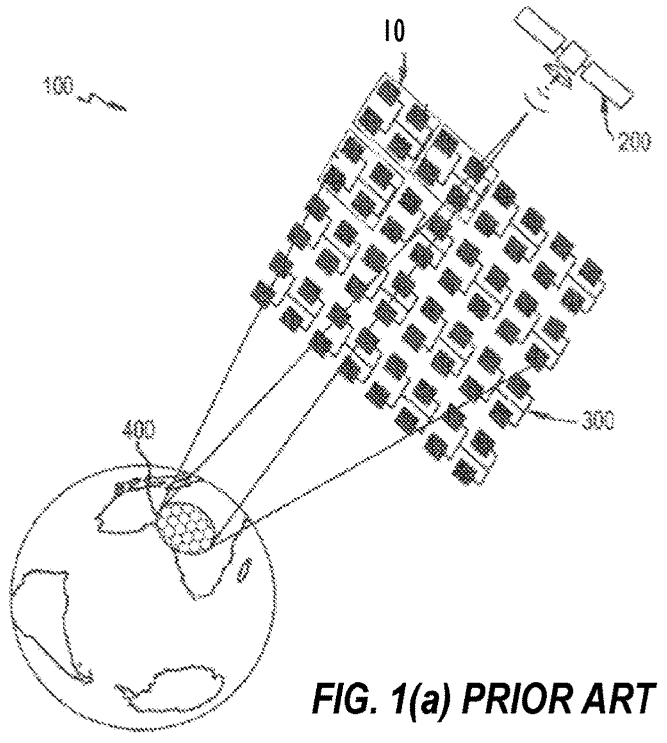
FIGS. 1(*a*), 1(*b*) show a large array.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Figure 2:
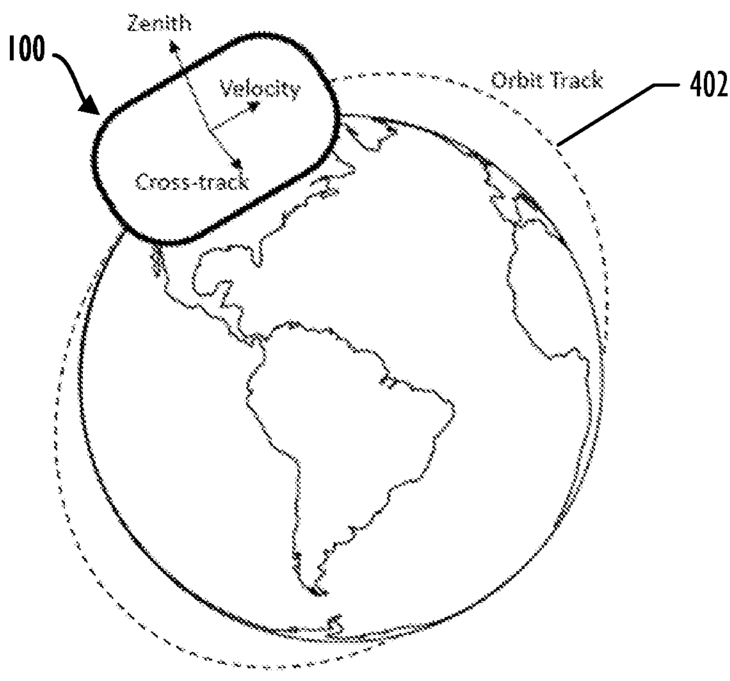
FIG. 2 shows a large flat structure in space and having an orbit track.
Figure 3A:
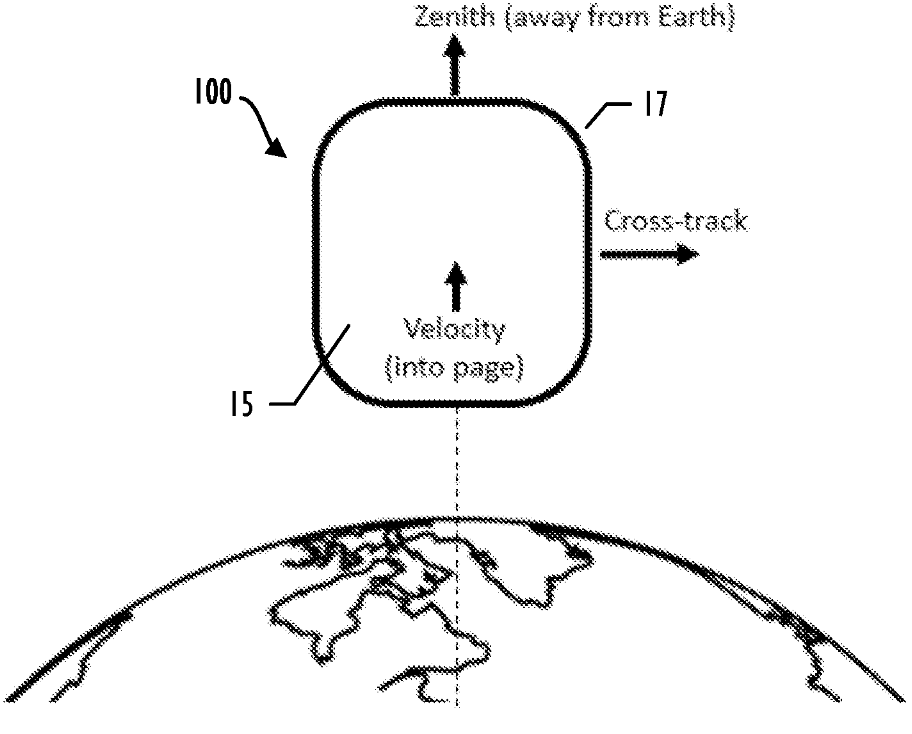
FIG. 3(*a*) shows the first stable orientation.
Figure 3B:
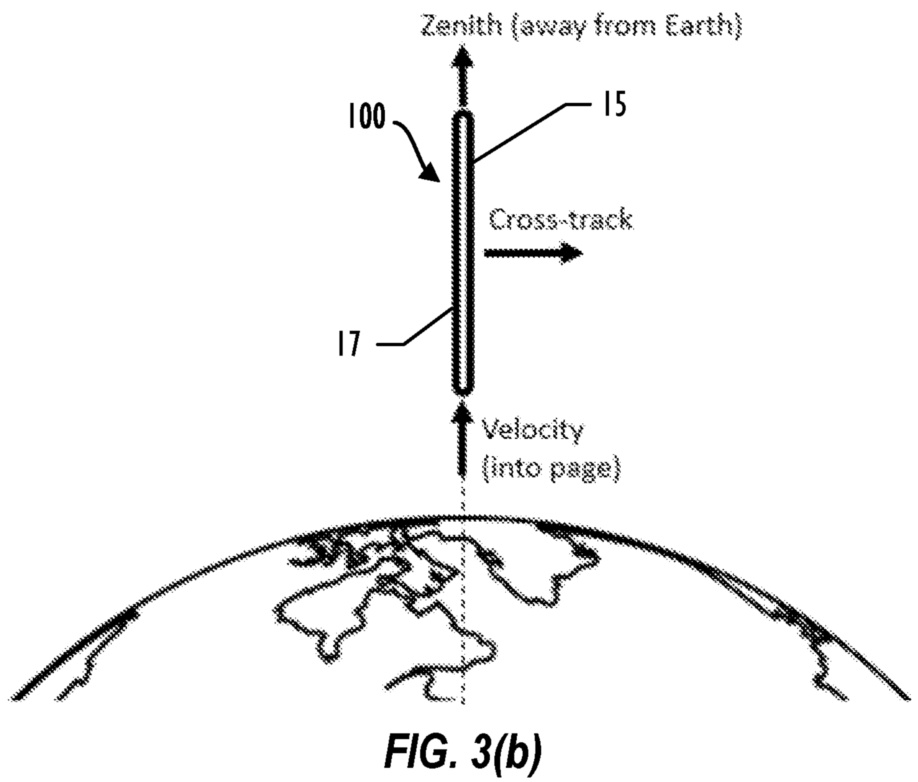
Figure 3C:
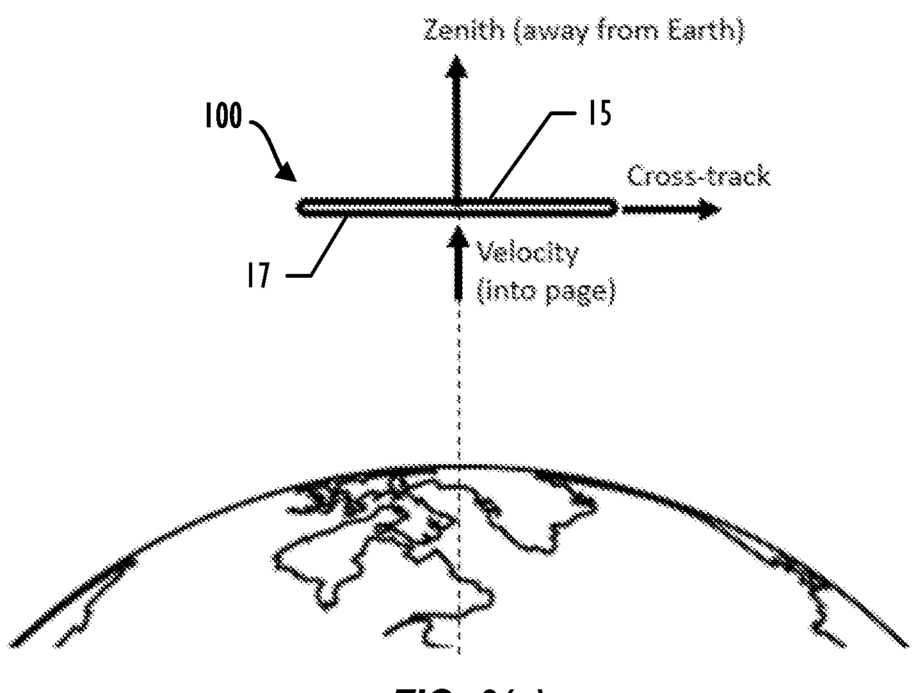
Figure 3D:
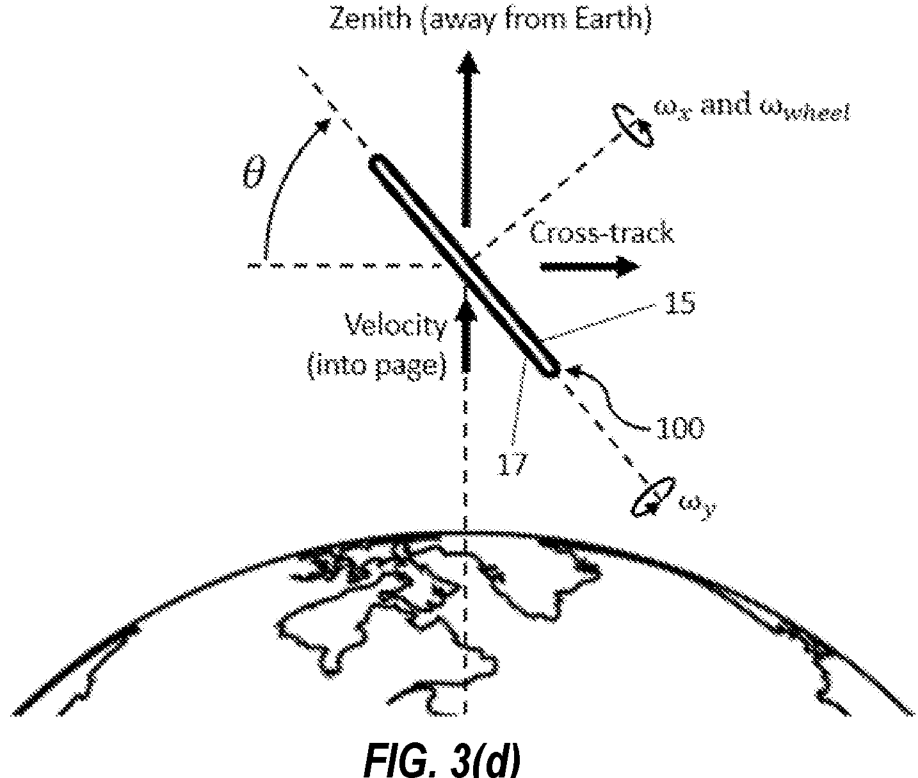
Figure 3E:
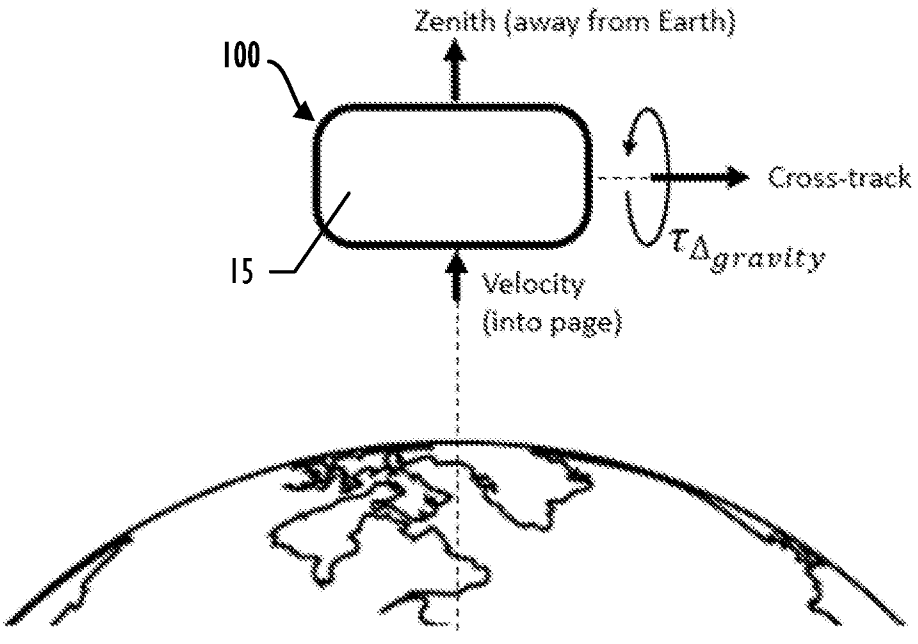
Figure 3F:
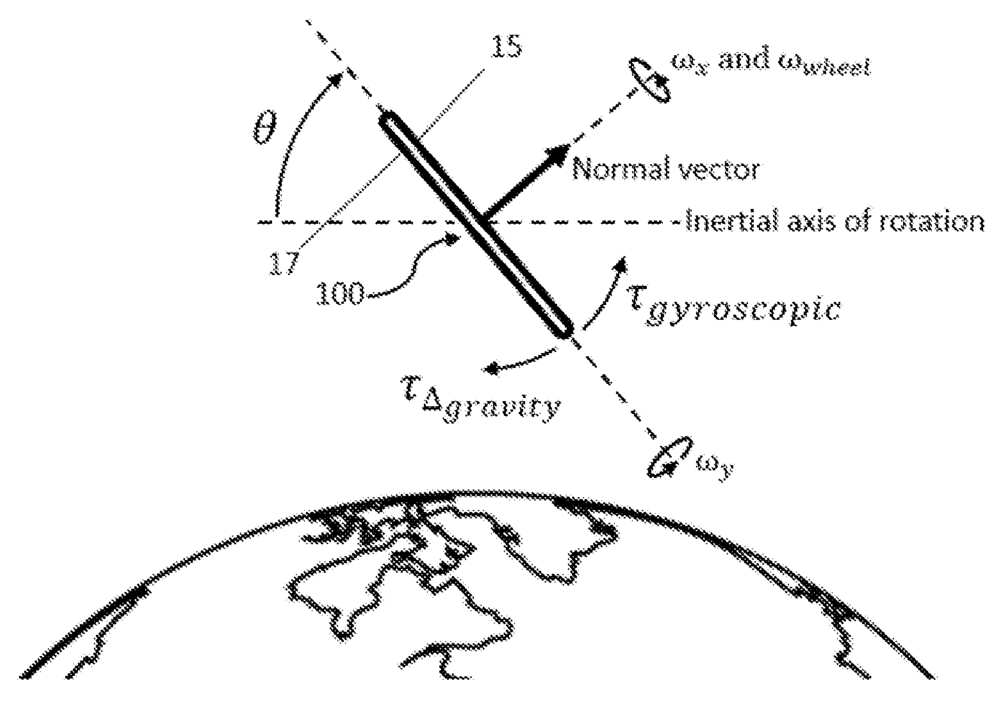
Figure 4A:
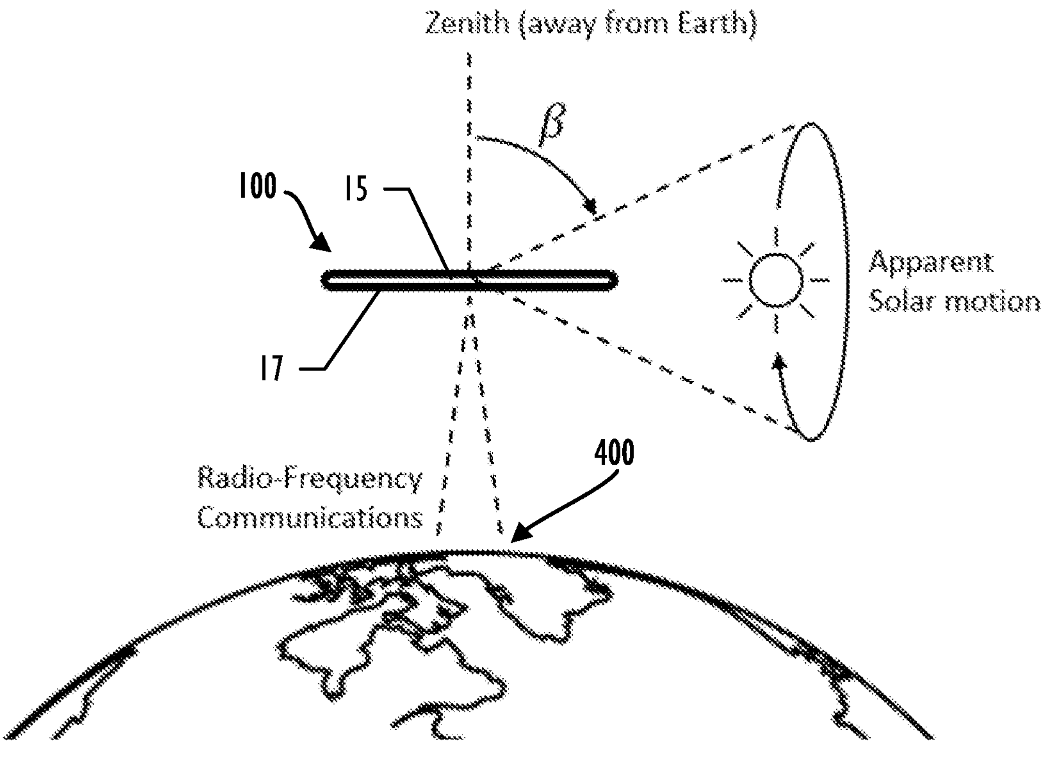
FIG. 4(*a*) shows solar motion and radio-frequency communications cones and the unstable equilibrium orientation.
Figure 4B:
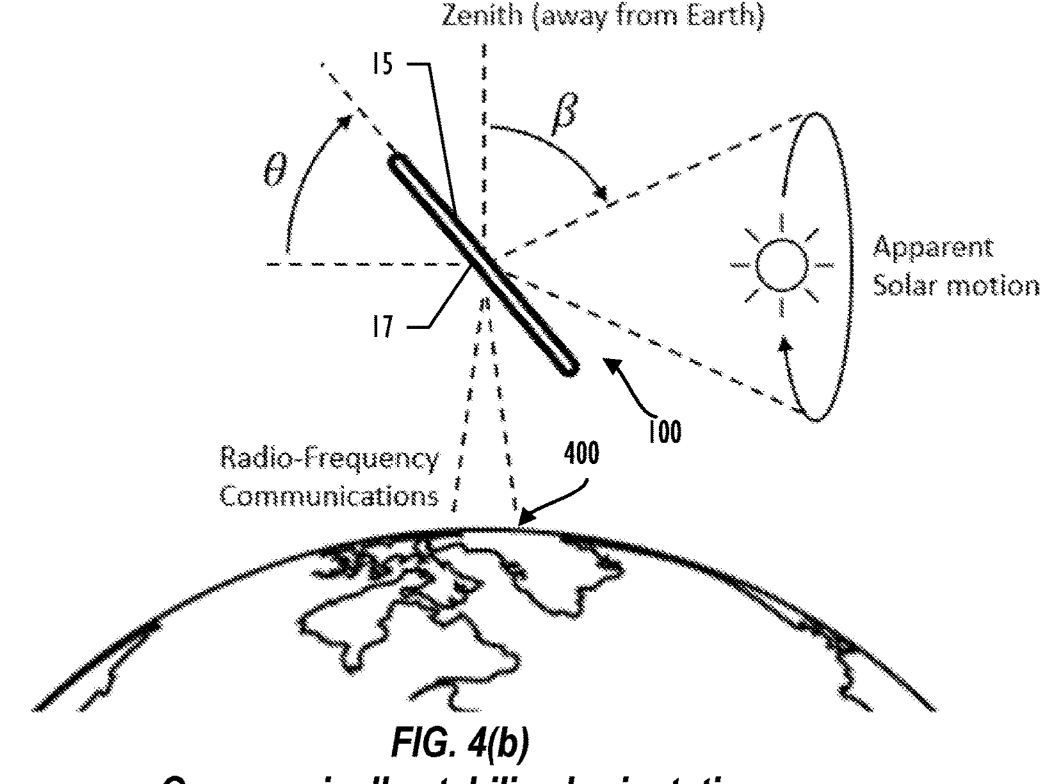

As shown in FIG. 2, the present disclosure includes a structure 100 that is in an orbit track 402 about the Earth. In one embodiment, the structure 100 can be a spacecraft such as a data center or satellite, or a large antenna or satellite array, such as shown in the '266 patent. The structure 100 has a large number of small structures 10, such as a satellite or antenna assembly 10 shown in FIG. 5, which are rigidly connected together to form a single array.

Figure 5:
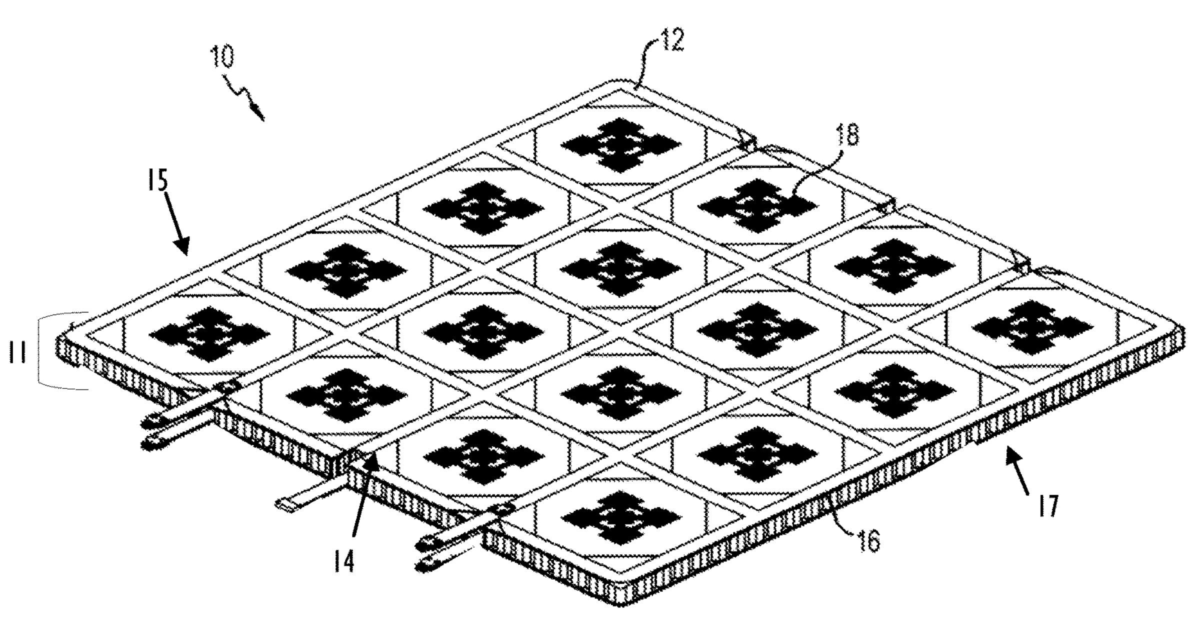
FIG. 5 shows an antenna assembly.
Figure 4C:
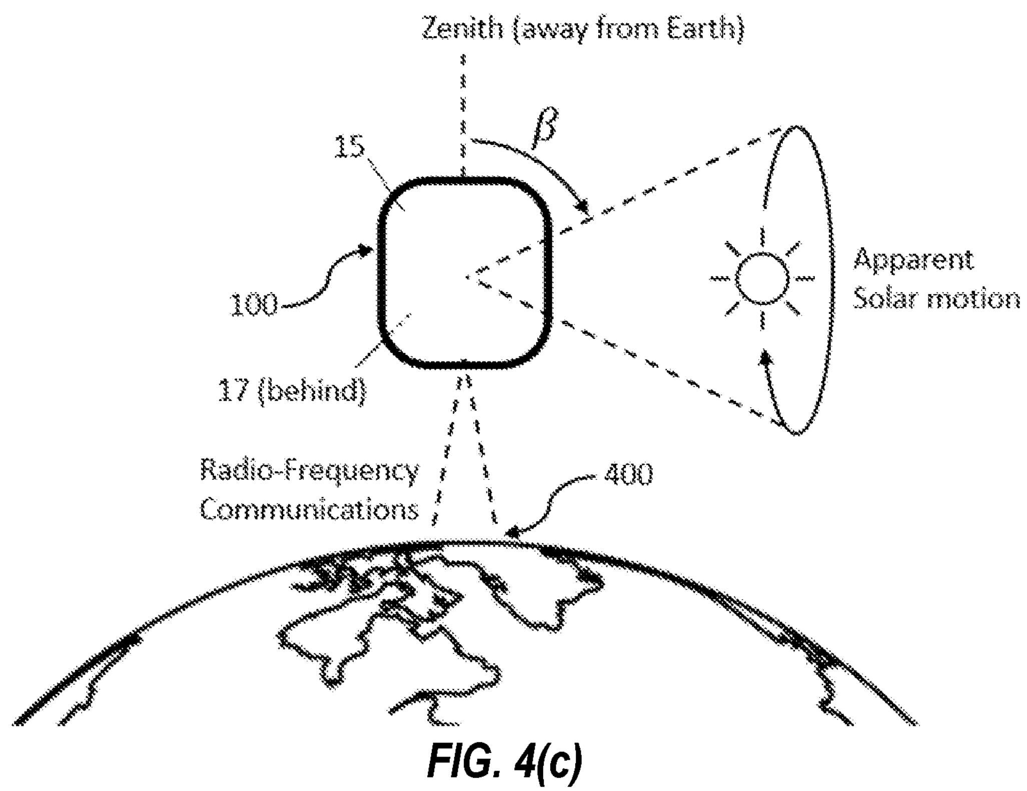
Figure 4D:
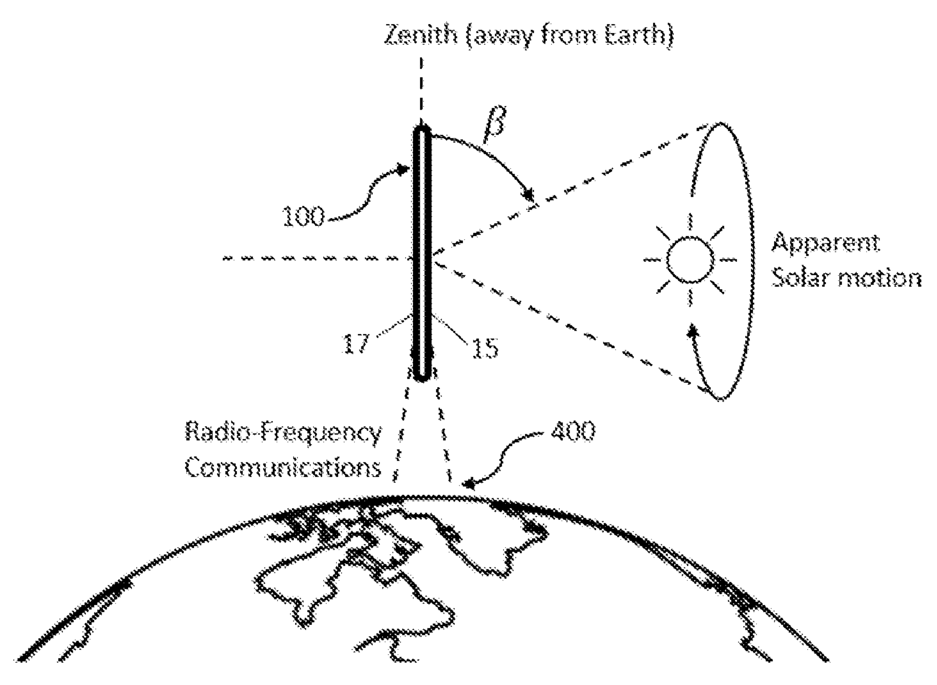

Referring to FIG. 5, the present disclosure is a system, for example in one embodiment a spacecraft 10 that orbits Earth. In one embodiment, the spacecraft is a structure, such as a satellite or antenna. The structure 10 has a solar panel that receives solar energy from the Sun and generates solar power for use by the structure. In one example, the structure 10 has an antenna body 11 with a communications layer 12 that includes antennas or antenna elements 18, an optional middle layer 16 that includes a rigid structure and electronic components, and a solar layer 14 that includes one or more solar cells. Each layer is a flat rectangular or square panel or tile, and the overall structure is flat and rectangular or square. The antenna body 11 has an interior or internal space.

Figure 6:
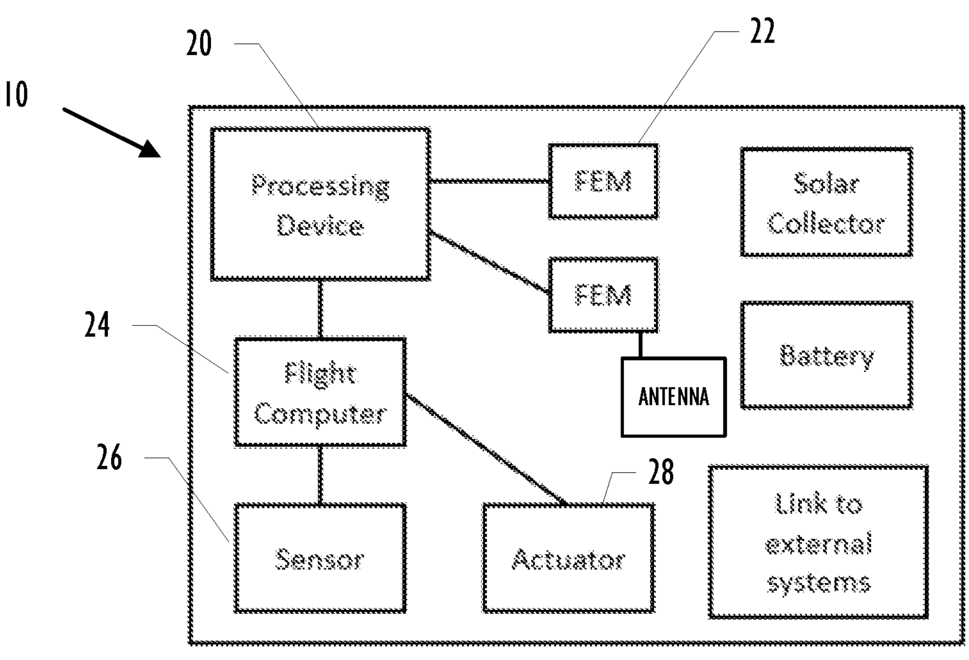
FIG. 6 is a block diagram of the antenna assembly.

Referring to FIG. 6, one or more of the antenna structures 10 can include a number of electronic components including a processing device 20, front end modules (FEM) 22, flight computer 24, one or more sensors 26, one or more flight actuators 28, solar collector, and link to external systems. The solar collectors/cells generate energy from the sun. Excess power from the solar cells can charge a battery, and/or the battery can provide power to the electronic components. Each FEM 22 is associated with a respective antenna of the communications layer 12 to transmit/receive signals. The processing device 20 controls overall operation of the electronic components, including receiving/transmitting signals via the FEM 22. The flight computer 24 receives signals from the sensors 26 as to the orientation and location of the antenna structure 10. In response to the received sensor signals, the flight computer 24 determines current orientation and location and sends a control signal to the actuators 28 to properly position the antenna structure 10.

In one embodiment, the control satellite 200 has access to and authority over all sensor data and actuators to control the overall phase array 100 orientation. The control satellite flight computer 224 is what reads in all sensor data and commands all actuators. Each small structure 10 only reads in its own sensor data to try and correct its orientation within the phase array 100. In addition, the FC 24, sensors 26, and actuators 28 can be utilized to ensure flatness of the array, as disclosed in co-pending application nos., which claim priority to Ser. Nos. 62/976,107 and 62/976,143 filed Feb. 13, 2020, respectively, the entire contents of which are hereby incorporated by reference. In one embodiment, the control satellite 200 can be separate from and connected to the array 100.

The orientation of the phase array 100 is controlled by the Control Satellite's 200 flight computer 224. This flight computer 224 accepts sensor data from its own sensor suite 226 and any other sensor 26 readings to determine the orientation of the phase array 100. Based on the determined and desired orientation of the phase array 100, the flight computer 224 commands its actuators 228 and those actuators 28 of the small structures 10 as necessary to ensure proper orientation of the phase array 100. In one embodiment, the sensor 26 can be a GPS that provides position data. In another embodiment, the sensor 26 can be an IMU such as an accelerometer, which provides acceleration data from which position data can be determined.

Returning to FIG. 5, the communications layer 12 has an outward-facing side surface with the antenna elements facing the Earth (nadir) to communicate with user devices (e.g., cell phones). The solar layer 14 has an outward-facing side surface with solar cells that generate solar power for use by the electronic components, e.g., the processing device 20, antennas, antenna front end modules 22, flight computer 24, sensors 26, and actuators 28, as shown in FIG. 6. The outward-facing side surface of the solar layer 14 faces in a direction (zenith) that is opposite of the outward-facing side surface of the communications layer 12. The outward-facing side surface of the solar layer 14 forms the upper surface 15 of the antenna structure 10 (as well as the combined structure 100), and the outward-facing side surface of the communications layer 12 forms the lower surface 17 of the antenna structure 10 (and the combined structure 100).

As the structure 100 orbits Earth, the solar side of the structure will be at an angle with respect to the Sun. Through the proper selection of a deviation angle (θ) as seen in FIG. 4(*b*), the solar cells on the upper surface of the structure 100 will receive improved sunlight exposure throughout the orbit of the structure 100 around the Earth. In this way, the deviation angle controls the pointing of the lower surface of the structure 100, and by extension the phase array 300, relative to the Earth footprint 400.

The rigid connection of each of the small structures 10 necessitates that the orientation of the structure 100 determines the orientation of each individual small structure 10. The orbit track 402 is an approximately circular orbit. The velocity vector is taken as the unit vector in the direction of motion of the structure 100. The zenith vector is taken as the unit vector centered at the spacecraft and pointing away from the center of the Earth. The cross-track vector is taken as the unit vector orthogonal to both the zenith and velocity vectors.

One goal of the present disclosure is to orient the structure 100 in a controlled manner based on three factors:

a. The first factor is for the structure 100 to receive as much sunlight as possible on its upper surface 15, which is converted into electricity using solar cells on that surface. The ultimate goal here depends on the desired application. If the normal vector to the upper surface 15 is parallel to the satellite-to-Sun vector then it receives maximum sunlight that is possible in that instant. In other embodiments, this maximum received sunlight condition is not necessary and is only achieved for fleeting instants. As the normal vector to the upper surface 15 moves away from being parallel to the Sun, the sunlight received is less. How much less it receives is design-specific and how much sunlight is necessary is also design-specific. The criteria to determine the sufficient amount of sunlight is dependent upon how much power the satellite consumes when it is ON and how much time the satellite should be ON and OFF.

One goal of this factor (in the absence of the others) is to have the normal to the upper surface 15 be parallel to the satellite-to-Sun vector for all time. Any deviations thereafter are monotonic with power received, so closer to parallel is always better since the power received will always be higher by being closer to parallel. However, this factor can be satisfied even if the satellite is not maximizing the amount of sunlight being received, such as when the power consumption requirement of the satellite is lower (such as when it is OFF or consuming less power).

2. The second factor is for the structure 100 to point its lower surface 17 as close to the center of the Earth as possible, which enables the antenna elements of the phase array 300 to effectively radiate radio frequency signals to a region 400 of users 500 on the Earth's surface. One goal (in the absence of the other two factors) is to point perfectly to the center of the Earth. The cost of deviations away from this perfect orientation are based on design-specific factors. Notably, pointing 10° is worse than pointing 5° away and at 180° (antenna-side pointed out to space) you will not be able to function. At 90° you would still be able to communicate with some users on the ground, but that may not be sufficient because at least half the users would be blocked from communication.

But there are some exceptions; for example, the users on the ground don't have to be evenly distributed, so pointing away from the center of the Earth isn't always worse. If all the users are North of the satellite, then it would be useful to point the antennas North instead of toward the center of the Earth. Pointing to the center of the Earth is a general rule that can be applied.

3. The third factor is to have minimal active control of the structure 100. Mechanically, controlling the attitude of the satellite requires actuating systems that exert torque and in space, such active control is cumbersome to provide. One goal is to ensure the satellite is in torque equilibrium, which requires minimal active control. That in turn reduces cost and on-orbit power for actuators. Torque equilibrium can be achieved, for example, by gyroscopic stabilization.

To explore factor 3 more deeply, it is perhaps best to seek an analogy for the mechanical control. An upright broomstick held from the bottom (inverted pendulum) requires minimal input control if it is very accurately held upright, but deviations mean you need to put in a lot of work to keep it upright. A horizontal broomstick held from one edge requires a very large counter-torque to prevent it from falling, which gravity is constantly trying to force it to do. This very large torque is required with either accurate or inaccurate control of the broomstick. A broomstick suspended from above requires negligible control authority since gravity will cause it to naturally fall into this position.

Since available technologies like star trackers permit highly accurate attitude knowledge for the structure 100, both stable orientations (like the broomstick suspended from above) (FIG. 3(*a*)) and unstable equilibrium orientations (like the upright broomstick held from below) (FIG. 3(*b*)) are considered to satisfy factor 3. Any non-equilibrium orientation (e.g., FIG. 3(*c*)) requires constant corrective torque (like the horizontal broomstick held from one edge) and, in general, constant torques are cumbersome to provide in the context of space actuation. The notable exception to this statement is gyroscopic torques, but they are inherently limited. Gyroscopic torques are generated by perpendicular rotation axes and are therefore not universally applicable to all cases. For instance, inertially stable bodies (not rotating relative to the Sun and Stars) are incapable of generating gyroscopic torques, since they are not rotating.

An equilibrium orientation exists when there are no net torques acting on the structure 100. However, it is by using a gyroscopic torque that specific non-equilibrium orientations (orientations that have a net torque acting on the structure) can be brought into equilibrium. If the gyroscopic torque exactly counteract external torques (e.g. the gravity gradient), then it will bring the net torque on the structure to zero. The category of orientations that can be brought to equilibrium (zero net torque on the structure) by using gyroscopic torques are referred to as gyroscopically stabilized orientations.

FIG. 3(*e*) shows an orientation where the gravity gradient torque cannot be counteracted by gyroscopic torques. The orientation in FIG. 3(*e*) is similar to that shown in FIG. 3(*a*), but the satellite has been rotated about the Cross-track vector. Since FIG. 3(*a*) is a stable orientation (like a broomstick suspended from above), this makes FIG. 3(*e*) an unstable orientation (like a broomstick held from one edge). For this unstable orientation to be maintained, the external torque (gravity gradient) would have to be constantly counteracted. However, since the gravity gradient torque and the orbital motion are both about the Cross-track vector, gyroscopic torques cannot be used for this purpose (gyroscopic torques always being perpendicular to the axis of rotation).

FIG. 3(*f*) shows an orientation where a gravity gradient torque and, for flat bodies, a natural gyroscopic torque necessarily exists about the velocity vector. Without the intentional control over the gyroscopic torque, the structure 100 would fall out of position (like the broomstick held from one edge). Intentional manipulation of the gyroscopic torque can cause it to exactly counteract the gravity gradient torque, bringing the structure 100 into equilibrium. There are two means of intentional manipulation of the gyroscopic torque.

1) Spinning the structure 100 to generate additional rotational motion, changing the net gyroscopic torque so that it counteracts the gravity gradient torque.
2) Spinning an internal component to generate additional rotational motion, changing the net gyroscopic torque so that it counteracts the gravity gradient torque.

In each case, bringing the structure 100 into equilibrium allows it to be easily controlled when the orientation of the structure 100 is accurately known. This balance can be achieved regardless of the angle θ as shown in FIG. 3(*f*), making an infinite number of orientations possible, each with at a different angle θ between 0° and 360°. These gyroscopically stabilized orientations are, depending on the orientation of the Sun relative to the orbit of the structure 100, better able to satisfy factors 1-3 than the stable (FIGS. 3(*a*)-(*b*)) and unstable equilibrium orientation (FIG. 3(*c*)) that are present without gyroscopic stabilization.

Orientations of Large Flat Structures in Space

The application of the structure 100 requires radio-frequency communication with the surface of the Earth. This is the basis for the definition of factor 2 and means that as the structure 100 orbits the Earth through the orbit track 402 (FIG. 2), it must rotate alongside the orbital motion and change its orientation to ensure that its lower surface 17 points towards the surface of the Earth 400. This makes a rotating reference frame that keeps the communications footprint on the Earth 400 in the same position relative to the structure 100 the most suitable for describing orientations of the structure 100. The rotating reference frame is based on the velocity vector (direction of motion of the structure 100), the zenith vector (vector pointing from the center of the Earth through center of the structure 100), and the cross-track vector (orthogonal to the velocity and zenith vectors) and is used in FIGS. 3(*a*)-3(*f*) and FIGS. 4(*a*), 4(*b*). In the rotating reference frame, we can determine which orientations permit factors 1-3 to be satisfied.

In the first stable orientation shown in FIGS. 3(*a*), 4(*c*), the normal to the lower surface 17 of the structure 100 is in the direction of the velocity vector (or the anti-velocity vector in the equivalent mirrored orientation). That necessarily means that the lower surface is pointed 90° from the Earth (i.e., the lower surface 17 is facing into the page) footprint 400 and so factor 2 (the lower communication side surface 17 faces the Earth) is not satisfied.

The Sun in the Zenith, Velocity, and Cross-track reference frame follows a conic pattern once per orbit. The half-angle of this cone (α) is determined by the Beta angle. The Beta angle is determined by the orbit and the Sun's position relative to Earth where the Beta angle is the angle of closest approach between the zenith vector and the Sun vector (vector pointing from the satellite to the center of the Sun). The Beta angle is not a considered to be a controllable variable since the orbit selection is driven by other factors (such as what regions of the Earth the satellite shall orbit above).

$$\alpha=90°-\beta$$

The apparent motion of the Sun at small Beta angles is a wide cone, passing near to the velocity, nadir, anti-velocity, and zenith vectors in a repeating pattern each orbit. The following conclusions can be drawn with respect to the first stable orientation shown in FIG. 3(*a*). When the Sun is near the anti-velocity vector (or the velocity vector in the equivalent mirrored orientation), the upper surface 15 will receive a large amount of sunlight once per orbit. At large Beta angles, the apparent motion of the Sun follows a narrow conic pattern, causing it to remain close to the Cross-track vector, which is perpendicular to the upper surface 15. In this case, little sunlight will ever reach the upper surface. For orbits that observe large Beta angles, factor 1 is not satisfied. Factor 3 is clearly satisfied since this is a stable orientation requiring negligible control authority (like the broomstick suspended from above).

In the second stable orientation shown in FIG. 3(*b*), the normal to the lower surface is aligned with the cross-track vector (or anti-cross-track vector in the equivalent mirrored orientation). This means that (in a similar manner to the first stable orientation) the lower surface 17 is pointed 90° from the Earth footprint 400 and factor 2 (the lower communication side surface 17 faces the Earth) is not satisfied. As seen in FIG. 4(*d*), the normal to the upper surface 15 is aligned with the anti-cross-track vector (or cross-track vector in the equivalent mirrored orientation). This means that at small Beta angles, the Sun is perpendicular to the upper surface 15 and little sunlight ever reaches the solar cells. At large Beta angles, the Sun is in alignment with the normal to the upper surface and excellent sunlight is received. For orbits that observe small Beta angles, factor 1 is not satisfied. Factor 3 is clearly satisfied since this is a stable orientation requiring negligible control authority (like the broomstick suspended from above).

In the unstable equilibrium orientation shown in FIG. 3(*c*), the normal to the lower surface 17 is pointed directly at the Earth footprint 400, which satisfies factor 2 (i.e., the lower communication side surface 17 faces the Earth). In this exact orientation, there is no gravity gradient torque, but deviations away from this point will generate a gravity gradient torque that pulls the structure 100 away from this position. This is because when the structure 100 is in the exact orientation as shown, each part of the structure is approximately equidistant from the center of the Earth and gravity acts equally across the surface. It is when the structure 100 deviates from this position that part of said structure will be closer to the Earth and the other part farther away. Since gravity acts by the square of the distance from the center of the Earth, the part of the structure that is closer will experience a gravitational pull that is greater than the part of the structure that is farther away. This differential application of gravity's pull generates a torque that will spin the structure. That behavior makes this orientation an unstable equilibrium point.

With accurate active control of the structure 100, it can maintain this orientation without a constant application of torque, which satisfies factor 3 (i.e., minimize active control). As seen in FIG. 4(*a*), the apparent Solar motion, and by extension the sunlight received by the upper surface of the structure 100, is a function of the Beta angle (β). When the Beta angle is small, factor 1 (i.e., the upper solar side surface 15 faces the Sun) can be satisfied, but for large Beta angles approaching 90°, factor 1 is not satisfied.

In the gyroscopically stabilized orientation shown in FIG. 3(*d*), the structure 100 is deviated from the attitude of FIG. 3(*c*) by a controlled angle (θ). Subject to the specific limitations of the phase array 300 forming radio frequency signals, this deviation can still satisfy factor 2 (i.e., the lower communication side surface 17 faces the Earth) when the deviation angle (θ) is small.

It can be seen in FIG. 4(*b*) that this deviation improves exposure of the upper surface 15 of the structure 100 to sunlight for large Beta angles, to better satisfy factor 1 (of course, the best relationship of the deviation angle to Beta is where theta equals beta). However, as seen in FIG. 3(*f*), a gravity gradient torque ($\tau_{\nabla gravity}$) is generated due to the orientation of the structure 100. This gravity gradient torque is exerted about the velocity vector, causing the structure 100 to begin to spin, drawing it to the orientation shown in FIG. 3(*b*). Since the velocity vector is perpendicular to the orbital rotation of the satellite 100, a gyroscopic torque (τgyroscopic) can be used to counteract the gravity gradient torque. It is by using gyroscopic torque that the gravity gradient can be counteracted without cumbersome requirements on the attitude control system of the structure 100, thus satisfying factor 3 (i.e., minimize active control).

Gyroscopic torques such as this, that utilize the orbital rotation of the structure, can in the idealization, be generated in perpetuity without any input (power, control, etc.). In practice, gyroscopic torques require some maintenance to ensure rotation rates are maintained despite internal friction or similar effects. This maintenance is minimal in comparison to the cost of employing existing alternative approaches to generating constant torques in space (electric propulsion, chemical propulsion, electromagnetic torque, etc.), which are not feasible for large structures in LEO orbits.

In the orientation without gyroscopic stabilization seen in FIG. 3(*e*), a gravity gradient is created about the cross-track vector, which is also the axis of rotation. Gyroscopic torques can only be generated perpendicularly to rotations, so a rotation about the cross-track vector can never generate a gyroscopic torque about the cross-track vector. In this case, gyroscopic torques cannot stabilize the system and factor 3 (i.e., minimize active control) is not satisfied.

Control of Large Flat Structures in Space

Figure 7A:
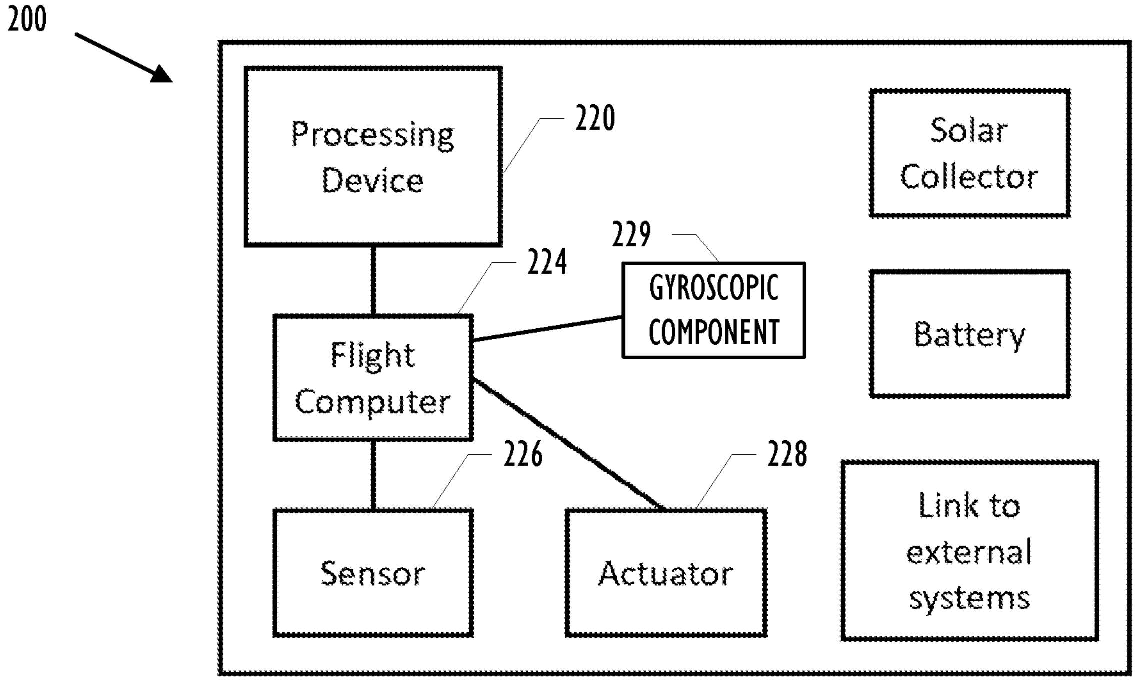
FIG. 7(*a*) is a block diagram of the control satellite.

The control of large flat structures 100 in space requires attitude determination, the process by which the structure 100 measures its own orientation. As shown in FIG. 7(*a*), the control satellite 200 can have a single sensor or a suite of sensors 226 (e.g. star trackers, sun sensors, inertial measurement units) which are used to determine the orientation of the structure 100. This attitude information is interpreted by the flight computer 224, which outputs command signals to an actuator or suite of actuators 228 (e.g. torque rods, reaction wheels, momentum wheels) to increase, reduce, or remove rotational motion, as necessary. In one embodiment, the flight controller 224 is a processing device, such as a processor or controller. Though the flight controller 224 is shown as a separate component as the processing device 220, the flight controller 224 can be combined with the processing device 220.

As previously described, holding stable orientations requires minimal control authority, since the structure 100 will naturally draw towards these orientations. However, no stable orientations of the structure 100 are able to satisfy factor 2 (i.e., the lower communication side surface 17 faces the Earth). Unstable orientations without gyroscopic stabilization require a constant torque, which are overly demanding of the actuator system and are unable to satisfy factor 3 (minimize active control). It is in the unstable equilibrium orientation shown in FIG. 3(*c*) or the gyroscopically stabilized orientation shown in FIG. 3(*d*) that all factors 1-3 may be satisfied. For the gyroscopically stabilized orientations, it is essential that the gravity gradient torque and necessary counterbalancing gyroscopic torques be defined.

The gravity gradient torque is the consequence of the disproportionate gravity force across a structure and is calculated by the following equation. The term α is the semi-major axis of the orbit, μ is Earth's standard gravitational parameter, $\vec{e}_\tau$ is the unit vector of the center of mass of the structure towards the center of the Earth, and I is the inertia matrix of the structure 100.

$$\tau_{\nabla gravity} = 3\left(\frac{\mu}{a^3}\right)\vec{e_r} \times I\vec{e_r}$$

As seen in the equation for the gravity gradient torque, the magnitude of the gravity gradient scales by the semi-major axis to the third power. This means that structures in Low Earth Orbit (LEO) at approximately 7,000 km (from the center of the Earth) semi-major axis will generate gravity gradient torques approximately 200 times larger than equivalent structures in geo-synchronous orbit (GEO) at approximately 42,164 km (from the center of the Earth) semi-major axis.

Gyroscopic torques are generated by two simultaneous axes of rotation on a body. In the absence of gyroscopic stabilization, when placed in the orientation shown in FIG. 3(*f*), large flat structures will naturally exhibit some gyroscopic torque. However, it is only for very specific structure shapes that this gyroscopic torque will naturally counteract the gravity gradient torque. Generally, active control over a second rotation axis is required to develop a gyroscopic torque that counteracts the gravity gradient.

If the structure 100 is symmetric about its normal vector, then it can spin about the normal vector while remaining in the gyroscopically stabilized orientation shown in FIGS. 3(*d*), 7(*b*). A rotation ($\omega_x$) of this type (spinning like a frisbee) is the first means of generating a gyroscopic torque that can counteract the gravity gradient. The second means of the structure 100 generating a gyroscopic torque is through spinning ($\omega_{wheel}$) an internal component (i.e. momentum wheel) about the normal vector, allowing for gyroscopic stabilization of the structure 100 whether or not it is symmetric about its normal vector. The spinning ($\omega_x$), ($\omega_{wheel}$) can be thousands of rotations per minute.

As shown in FIG. 7(*b*) and FIGS. 3(*d-f*), both examples (where the entire phase array rotates (without a gyroscopic wheel), and where the gyroscopic component rotates (and the phase array does not)), the structure has spin components about the x and y axes (shown) and they are defined in the equations below. The wheel (in the second example) rotates about the x axis, which is also shown, but the entire phase array 300 and the control satellite 200 stays put (is stationary) in the rotating frame (i.e., as it orbits the Earth, it rotates (once per orbit) so that it maintains the orientation shown in FIG. 4(*b*) throughout its orbit). It is the gyroscopic component which spins, but only within the control satellite.

The first means of gyroscopic stabilization of the structure 100 is through a specific combination structure 100 rotation rates. As seen in FIG. 3(*f*), in the rotating reference frame defined by the velocity vector, zenith vector, and cross-track vector, the structure 100 can rotate about its normal vector (like a frisbee) without affecting its tilt (θ) relative to the inertial axis of rotation. This entire reference frame also rotates with the structure 100 around the Earth once per orbit, driven by the orbital motion of the structure 100. It is the combination of these two rotations that generates a controlled gyroscopic torque. The rotation of the reference frame is driven by orbital behavior and cannot necessarily be controlled, but the rotation of the structure about its normal vector can be directly controlled so that the net gyroscopic torque counterbalances the gravity gradient torque, creating equilibrium for the structure 100 in the rotating reference frame. It should be noted that the gravity gradient torques and gyroscopic torques are not balanced in the inertial reference frame.

Let the angle between the zenith vector and the normal vector be defined as θ. The x axis is defined as colinear with the normal vector to the upper surface. The z axis is defined as being aligned with the velocity vector. The y axis is defined as being orthogonal to the x and z axes using the right-hand-rule.

Under the first example of the control, where the rotation of the structure 100 creates the gyroscopic torque that counterbalances the gravity gradient torque, the rotation of the structure about the normal vector is defined by ($\omega_x$) according the following equation. $I_x$, $I_y$, and $I_z$ are the structure's moments of inertia in the x, y, and z directions, respectively, $\omega_{orbit}$ is the orbital rotation rate, $\omega_x$, $\omega_y$, and $\omega_z$ are the rotation rates of the spacecraft around the x, y, and z axes, respectively. This equation is only valid for the case where $$I_y = I_z = \frac{I_x}{2},$$

which is a property of large flat structures symmetric about the z axis.

$$\omega_x = \sin(\theta)\omega_{orbit}$$

$$\omega_y = -\cos(\theta)\omega_{orbit}$$

$$\omega_{orbit} = \sqrt{\frac{\mu}{a^3}}$$

Through the rotation of the entire structure 100, it will remain stationary in the rotating reference frame shown in FIG. 3(*d*) except for a frisbee-like spin about its normal vector. The simplicity of these equations should not be taken to imply triviality, as it is an elegant consequence of the gravity gradient, orbital mechanics, and gyroscopic precession all being functions of Earth's standard gravitational parameter (μ), the semi-major axis of the orbit (α), and the structure's moment of inertia ($I_x$, $I_y$, $I_z$).

Accordingly, in this first example of gyroscopic stabilization, the gyroscopic component 229 does not exist. Instead, the magnetic torque rods (part of 228) torque the entire phase array so that the entire phase array spins.

The second example of gyroscopic stabilization uses a momentum wheel 229 internal to the structure 100 instead of a rotation of the structure 100 itself. In this manner, the structure 100 remains entirely stationary in the rotating reference frame shown in FIG. 3(*d*). The combination of momentum wheel rotation and the orbital rotation of the structure 100 generates the gyroscopic torque that can be actively controlled to counterbalance the gravity gradient torque. It should be noted that though stationary in the rotating reference frame, the structure 100 may naturally generate a gyroscopic torque of its own, depending on its shape.

Under the second example of the control, the rotation of the entire structure 100 about its normal vector is replaced by the rotation of an internal component about the same axis. A momentum wheel 229 internal to the satellite structure that is spun-up will generate a functionally equivalent gyroscopic torque. The angular momentum that is required by the momentum wheel ($L_{wheel}$) and the rotation rates used are determined by the following equations.

$$\omega_x = -\sin(\theta)\omega_{orbit}$$

$$\omega_y = -\cos(\theta)\omega_{orbit}$$

$$L_{wheel} = 2I_z\omega_x$$

This second example of gyroscopic stabilization permits the entire structure to remain completely stationary (no frisbee-like spin) in the rotating reference, permitting the holding of a gyroscopically stabilized attitude for an asymmetric structure 100 with $I_z \neq I_y$.

As shown in FIGS. 4(*a*), 4(*b*), gyroscopically stabilized orientations can provide better Sun exposure of the upper surface of the structure 100 but the deviation angle (θ) is limited by the requirement of pointing the lower surface of the structure 100 toward the Earth footprint 400. For non-zero Beta angles (β), angular offsets will increase power generated by the solar cells on the upper surface of the structure 100 in a very predictable manner but degrades radio-frequency communications of the phase array 300 with the Earth footprint 400 in a non-linear design-specific fashion.

In one embodiment of this second example, the control satellite 200 contains a gyroscopic component 229 that is used to create a gyroscopic force that establishes and maintains equilibrium for the structure 100. The gyroscopic component 229 is connected to the flight computer 224 and/or the processor 220, which control operation of the gyroscopic component 229. In one embodiment, the gyroscopic component 229 can be a momentum wheel, and the flight computer 224 and/or processor 220 control the gyroscopic component 229 to turn ON and OFF, and to rotate at a desired rate. The gyroscopic component 229 can be positioned internal to the control satellite 200. In one embodiment, the control satellite 200 is positioned approximately at the center of the phase array 300 and fixedly mounted to the phase array 300. The momentum wheel rotates inside the control satellite 200 with respect to the control satellite housing.

For example, the momentum wheel can rotate about an axle that is rotatably mounted by a gear to a housing of the control satellite 200. Thus, the control satellite 200 housing does not rotate with respect to the phase array 300, but the momentum wheel rotates with respect to the housing. However, the entire phase array 300 remains stationary (except that it rotates to maintain the same orientation (FIG. 3(*d*)) with respect to Earth during its orbit. The gyroscopic component 229 spins up slowly (a few hours up to a few days) against a counter-torque provided by the magnetic torque rods (part of 228). In another embodiment, the momentum wheel need not be inside the control satellite housing, but can have its own housing that is fixedly mounted to the phased array 300, such as at the center of the phased array 300, or can be in one or more of the common satellite structures 10.

Application

The orientation of a spacecraft orientation (especially at large scales) is frequently controlled using reaction wheel systems (RWS) and/or control moment gyroscopes (CMG), but can also be controlled with electric propulsion, chemical propulsion, or electromagnetic torquers. RWS can be used as actuators for orientation control but will saturate if commanded to provide a constant torque in perpetuity. Saturation is the condition at which an actuator has produced as much torque in one direction as it is able to, past which it loses the ability to provide torque in that direction. CMG's are subject to the same saturation-based limitation as RWS and propulsion systems are limited by their finite fuel source. Electromagnetic torquers are not inherently limited, but require large devices to generate appreciable torques and cannot exert torques except where permitted by the local direction of Earth's magnetic field.

Large structures in LEO require cumbersome propulsion or electromagnetic torque systems to counterbalance constant gravity gradient torques or can use gyroscopic stabilization as described above. For GEO satellites, the burden imposed by the gravity gradient torque is significantly reduced (200*x*) relative to LEO satellites due to the difference in semi-major axis between the two orbital regimes. It is for this reason that GEO satellites can pursue alternative means (e.g. propulsion systems) to permit the constant application of torque that counterbalances the gravity gradient torques. However, those alternative means are not suitable for use in LEO because they are not able to provide sufficient force to counteract the increased gravity gradient torque impacting structures in LEO.

Figure 1B:
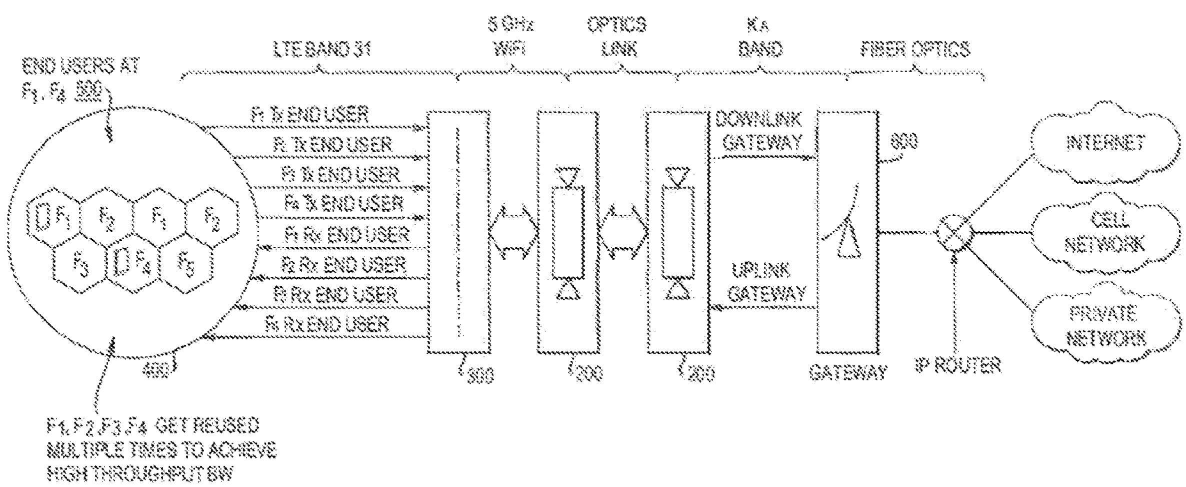

In one embodiment of the present disclosure, an actuator suite and a sensor suite are present on the control satellite 200 (FIG. 1(*a*)). As shown in FIG. 7, the control satellite 200 includes a processing device 220, flight computer 224, one or more sensors 226, and one or more actuators 228. The control actuators 228 can include, for example, reaction wheels, momentum wheels, and electromagnetic torque rods. The control sensors 226 can include, for example, star trackers, sun sensors, inertial measurement units and global position system units.

At the satellite structures 10 (FIGS. 5, 6), the one or more structure actuators 28 include, for example, electromagnetic torque rods, and the one or more structure sensors 26 include, for example inertial measurement units and global position system units.

The aggregate coordinated control authority of the control satellite 200 and the small satellites 10 is used to control the orientation and rotation rates of the entire structure 100. A momentum wheel in the control satellite 200 is spun about the normal vector of the structure 100 at a specific rate that, in combination with the orbital rotation of the structure 100, brings the structure 100 into equilibrium. Gyroscopic torque is generated by the momentum wheel's momentum state and the orbital rotation. This generated gyroscopic torque has to cancel out the net torque from the gravity gradient and the structure's natural gyroscopic torque.

$$\tau_{wheel\ gyro}=L_{wheel}\times\omega=I_{wheel}\omega_{wheel}\times\omega$$

$\omega$ is the rotation of the structure, $I_{wheel}$ is the wheel's moment of inertia (how big the actuator is), $\omega_{wheel}$ is the rotation rate of said wheel (in our case it is held at a specific spin rate), and $L_{wheel}$ is the angular momentum of the wheel (moment of inertia multiplied by the wheel's spin rate).

The structure's natural gyroscopic torques are defined by Euler's rigid body equations.

$$\tau_x=(I_z-I_y)\omega_z\omega_y$$

$$\tau_y=(I_x-I_z)\omega_x\omega_z$$

$$\tau_z=(I_y-I_x)\omega_y\omega_x$$

The gravity gradient torque has previously been defined.

The reaction wheels and torque rods from 200 are used for fine control of the structure. Small deviations from the desired orientation are corrected using these systems. The sensor suite of 200 (star trackers, sun sensors, IMUs (accelerometers) and GPS) is used to determine the orientation and position of the structure. These sensors determine if there are deviations from the desired orientation of the structure 100. The sensor suite of the satellites 10 determine the shape and orientation of the phase array relative to the control satellite 200.

In one embodiment, there are 2 sensors (1 IMU and 1 GPS), and 0-2 torque rods on each satellite 10. The sensors 26 and actuators 18 can be distributed based on modal analysis and to best counteract the vibrational modes of the structure.

The flight computer (FC) 224 is in charge of controlling the orientation of the entire structure. It directly receives all sensor data from its sensors 226 and can command its actuators 228. It (224) also receives processed sensor data from each common satellite 10 and can indirectly command the actuators 28 (FC 224 sends a command to FC 24, which passes the command on to actuators 28). In this manner, the actuators on each 28 just become an extension of actuators 228. The FC 224 determines if the orientation of the structure has deviated from the desired and can command any or all actuators to correct the orientation.

The wheels (reaction and momentum) within the actuator suite 228 enact control of the structure by changing their spin rate. Wheels are ideally kept at small spin rates to minimize drag and improve controllability, but they can be spun at high rates, thus causing them to hold a large amount of momentum and thereby generate gyroscopic torques (the principle used by the gyroscopic component 229). Wheels designed for this purpose are aptly named momentum wheels, since they hold a high momentum state by spinning rapidly. Since 200 is rigidly attached to the structure 100, a spinning momentum wheel, in combination with the orbital motion, generates a torque within 200 that (due to the rigid connection) counteracts the gravity gradient on the whole structure 100. The flight computer 224 needs to determine the desired angle θ that should be held, determine what spin rate is needed for that angle (given gyroscopic and gravity gradient torques) and then commands the momentum wheel (s) serving as the gyroscopic component 229 to spin to that rate.

Thus, a passive objective is to counteract the gravity gradient with a constant gyroscopic torque. You spin up the satellite or spin up a momentum wheel and just leave it spinning until you change your structure angle θ. An active objective is maintaining the desired orientation, which takes constant sensing and tweaking of the orientation by the actuators.

FIG. 8 is a flowchart demonstrating how the orientation 50 is maintained (the "active" task). All sensors data, step 52, is fed to the FC 224 which determines if the orientation is off, step 53. If yes, step 53, it generates commands for any or all actuators, step 54, and the actuators 228 enact those commands, step 56; and the FC 24 relays commands so that actuators 28 can enact those commands, step 57.

FIG. 9 is a flowchart demonstrating how the gyroscopic torque 70 is generated. The FC 224 determines the desired angle θ (based on Beta angle and maybe input commands sent from ground control), step 72, determines what the gravity gradient will be and what gyroscopic torque is necessary to it, step 74. At step 76, it then commands the actuators to generate rotational motion (either the whole structure or momentum wheel(s)) in the correct direction, step 78.

The remaining actuators and sensors are used to ensure the accurate orientation of the structure in the gyroscopically stabilized orientation shown in FIG. 3(*d*). Based on the information measured by the control sensors 226, 26 on the control satellite 200 and/or the small satellites 10, the flight computers 224, 24 can, given the current measured orientation of the structure 100, provide commands to their associated actuators 228, 28. These commands are enacted by the actuators 228, 28 to produce realized torques on the structure 100 that can bring the structure 100 from its current orientation to a desired orientation. This situation permits the LEO satellite to maintain its gyroscopically stabilized orientation of the entire structure 100 in perpetuity.

In the embodiments shown, the small satellites 10 and/or the central satellite 200 can include a processing device to perform various functions and operations in accordance with the system and method of the disclosure; for example, including the processing devices 20, 220 and the flight computers 24, 224. The processing device can be, for instance, a computing device, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the system and method can be stored on or read from the storage device. The processing device can execute software that can be stored on the storage device. Unless indicated otherwise, the process is preferably implemented in automatically by the processor substantially in real time without delay.

Accordingly, the system evaluates the sensed data, generates a flight pattern, and operates the actuator to implement that flight pattern. There are three primary orientations to position the flat phased antenna array 300. The first two, shown in FIGS. 3(*a*) and 3(*b*), are stable, but point the bottom surface (antennas) 90° away from Earth, so those are not good options. The third is unstable, as shown in FIG. 3(*c*), and is the default position for conventional nadir flying satellites, such as the phased array 300.

The present disclosure maintains the phased array 300 in the orientation shown in FIG. 3(*d*) and FIG. 4(*b*). This orientation can increase the power generated on the solar layer 14 surface in all cases except when β=0°. As long as the offset angle θ is relatively small, it is acceptable from an RF perspective, i.e., it provides a reliable communication from the antenna on the communications layer 12 of the phased array with Earth. Any offset has a negative implication for RF, so the angle choice is a trade-off between power and RF.

However, this orientation of FIG. 3(*d*) is not inherently in equilibrium, so it needs to be stabilized. By bringing it into equilibrium, it can be held in perpetuity. But bringing it into equilibrium can be challenging because the gravity gradient and natural gyroscopic torques depend on the moment of inertia and orbit altitude. The structure 300 is large and flat, which means it has a significant moment of inertia. And it operates in LEO orbit, which has high gravity gradients and gyroscopic torques (by virtue of the fast orbital period). Thus, to maintain the phased array 300 in equilibrium, gyroscopic torques are generated. In particular, the entire phase array structure 300 is rotated about its center (i.e., about the normal vector, for example as a pizza). The flight computer 224 sends a command to the flight actuator 228 to spin the entire structure to perform the rotation/spin. This is achieved over a matter of hours or days the magnetic torque rods (in the actuator 228).

In another embodiment, the internal gyroscopic component 229 is provided, such as a momentum wheel (e.g., a cylindrically symmetric component such as a flat disc located inside the control satellite 200 and controlled by the flight computer 224 or processor 220) is rotated about the normal vector.

Gyroscopic torques are used because they generate a constant torque. Once the spinning motion is generated, it continually generates gyroscopic torque to keep the array 300 stabilized, at minimal power. This is implemented by watching the angle of the Sun (β) and performing the system-specific trade-off of RF vs. solar power to find which offset angle θ should be used.

In yet another embodiment of the present disclosure, data (such as position and attitude) can be transmitted from the satellites 10 and/or 200 (e.g., by processing devices 20 and/or 220) to a ground station. The ground station processing device can then determine the necessary gyroscopic torque and/or other flight information and transmit, via a ground station antenna, a control signal to the satellites 10 and/or 200 (e.g., processing devices 20 and/or 220) to control the flight pattern (e.g., by use of the actuators 28 and/or 228).

In one example, the system of the present disclosure can be utilized in an array of antenna assemblies, such as to form an array 300 of small satellites 10. When the structure is configured as an antenna array, it (e.g., the antennas or antenna elements) communicates with processing devices on Earth, such as for example a user device (e.g., cell phone, tablet, computer) and/or a ground station. The present disclosure also includes the method of utilizing the antennas to communicate with processing devices on Earth. The present disclosure also includes the method of processing devices on Earth communicating with the antennas. In addition, the antennas can be used in Low Earth Orbit (LEO) or in other orbits or for other applications. Still further, while the system and method has been described as for an array of antenna assemblies, the system and method can be utilized for other applications, such as for example data centers, reflectors, and other structures, both implemented in space or terrestrially.

It is further noted that the description and claims use several geometric or relational terms, and several directional or positioning terms, such as planar, upper, lower, side, parallel, normal, surface, and flat. Those terms are merely for convenience to facilitate the description based on the embodiments shown in the figures. Those terms are not intended to limit the disclosure. Thus, it should be recognized that the system can be described in other ways without those geometric, relational, directional or positioning terms. In addition, the geometric or relational terms may not be exact. For instance, walls may not be exactly perpendicular or parallel to one another but still be considered to be substantially perpendicular or parallel. And, other suitable geometries and relationships can be provided without departing from the spirit and scope of the disclosure.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. An antenna system comprising:

a plurality of antenna assemblies coupled together to form a flat phased array, wherein a first surface of the flat phased array comprises a plurality of solar cells and a second surface of the flat phased array comprises a plurality of antennas, the second surface different than the first surface; and processing circuitry configured to:

determine, based on a position of the first surface of the flat phased array relative to a Sun or a position of the second surface of the flat phased array relative to Earth, a desired orientation of the flat phased array, wherein the desired orientation comprises a desired angle to maintain the flat phased array such that a gyroscopic torque exerted on the flat phased array when oriented in the desired angle counterbalances with a gravity gradient torque acting on the flat phased array when oriented in the desired angle, determine a spin rate to maintain the flat phased array in the desired angle; and control one or more actuators, based on the determined spin rate, to exert the gyroscopic torque on the flat phased array to maintain the flat phased array in the desired angle.

2. The antenna system of claim 1, wherein the one or more actuators comprise at least a gyroscopic component configured to generate rotational motion, and wherein to control the one or more actuators, based on the determined spin rate, to exert the gyroscopic torque on the flat phased array to maintain the flat phased array in the desired angle, the processing circuitry is configured to control the rotational motion of the gyroscopic component.

3. The antenna system of claim 2, wherein the gyroscopic component comprises a momentum wheel.

4. The antenna system of claim 1, wherein to control the one or more actuators, based on the determined spin rate, to exert the gyroscopic torque on the flat phased array to maintain the flat phased array in the desired angle, the processing circuitry is configured to control the one or more actuators to control a rotation of the flat phased array about a normal vector of the flat phased array.

5. The antenna system of claim 4, wherein the one or more actuators comprise one or more torque rods.

6. The antenna system of claim 1, wherein the processing circuitry is located at a ground station.

7. The antenna system of claim 1, wherein the desired orientation comprises a position of the flat phased array at an angle offset from an orthogonal to a surface of the Earth.

8. A method comprising:

determining, by processing circuitry of an antenna system comprising a plurality of antenna assemblies coupled to form a flat phased array, a desired orientation of the flat phased array, wherein the desired orientation comprises a desired angle to maintain the flat phased array such that a gyroscopic torque exerted on the flat phased array when oriented in the desired angle counterbalances with a gravity gradient torque acting on the flat phased array when oriented in the desired angle, wherein a first surface of the flat phased array comprises a plurality of solar cells and a second surface of the flat phased array comprises a plurality of antennas, the second surface different than the first surface, and wherein determining the desired orientation is based on a position of the first surface of a phased array relative to a Sun or a position of the second surface of the phased array relative to Earth;

determine a spin rate to maintain the flat phased array in the desired angle; and controlling, by the processing circuitry of the antenna system, one or more actuators, based on the determined spin rate, to exert the gyroscopic torque on the flat phased array to maintain the flat phased array in the desired angle.

9. The method of claim 8, wherein the one or more actuators comprise at least a gyroscopic component configured to generate rotational motion with respect to the plurality of antenna assemblies to maintain the flat phased array in the desired angle, and wherein controlling the one or more actuators, based on the determined spin rate, to exert the gyroscopic torque on the flat phased array to maintain the flat phased array in the desired angle comprises controlling the rotational motion of the gyroscopic component.

10. The method of claim 9, wherein the gyroscopic component comprises a momentum wheel.

11. The method of claim 8, wherein controlling the one or more actuators, based on the determined spin rate, to exert the gyroscopic torque on the flat phased array to maintain the flat phased array in the desired angle comprises controlling the one or more actuators to control a rotation of the flat phased array about a normal vector of the flat phased array.

12. The method of claim 11, wherein the one or more actuators comprise one or more torque rods.

13. The method of claim 8, wherein the processing circuitry is located at a ground station.

14. The method of claim 8, wherein the desired orientation comprises a position of the plurality of antenna assemblies at an angle offset from an orthogonal to a surface of the Earth.

15. A computing device, comprising:

memory; and one or more processors coupled to the memory and configured to:

determine a desired orientation of a plurality of antenna assemblies coupled to form a flat phased array, wherein the desired orientation comprises a desired angle to maintain the flat phased array such that a gyroscopic torque exerted on the flat phased array when oriented in the desired angle counterbalances with a gravity gradient torque acting on the flat phased array when oriented in the desired angle, wherein a first surface of the flat phased array comprises a plurality of solar cells and a second surface of the flat phased array comprises a plurality of antennas, the second surface different than the first surface;

wherein the desired orientation is determined based on a position of the first surface of a phased array relative to a Sun or a position of the second surface of the phased array relative to Earth;

determine a spin rate to maintain the flat phased array in the desired angle; and control one or more actuators, based on the determined spin rate, to exert the gyroscopic torque on the flat phased array to maintain the flat phased array in the desired angle.

16. The computing device of claim 15, wherein the one or more actuators comprise at least one gyroscopic component configured to generate rotational motion, and wherein to control the one or more actuators, based on the desired spin rate, to exert the gyroscopic torque on the flat phased array to maintain the flat phased array in the desired angle, the one or more processors are configured to control the rotational motion of the gyroscopic component.

17. The computing device of claim 15, wherein to control the one or more actuators, based on the determined spin rate, to exert the gyroscopic torque on the flat phased array to maintain the flat phased array in the desired angle, the one or more processors are configured to control the one or more actuators to control a rotation of the flat phased array about a normal vector of the flat phased array.

* * * * *